US007826377B2

United States Patent
Pepper

(10) Patent No.: US 7,826,377 B2
(45) Date of Patent: *Nov. 2, 2010

(54) MEMORY ACCESS OPTIMIZATION AND COMMUNICATIONS STATISTICS COMPUTATION

(75) Inventor: Gerald Pepper, Thousand Oaks, CA (US)

(73) Assignee: Ixia, Calabasas, CA (US)

(*) Notice: Subject to any disclaimer, the term of this patent is extended or adjusted under 35 U.S.C. 154(b) by 1073 days.

This patent is subject to a terminal disclaimer.

(21) Appl. No.: 11/424,832

(22) Filed: Jun. 16, 2006

(65) Prior Publication Data

US 2007/0291654 A1    Dec. 20, 2007

(51) Int. Cl.
*H04L 12/26* (2006.01)
(52) U.S. Cl. ..................................... 370/241
(58) Field of Classification Search ................. 370/241
See application file for complete search history.

(56) References Cited

U.S. PATENT DOCUMENTS

| | | | | |
|---|---|---|---|---|
| 5,742,760 | A * | 4/1998 | Picazo et al. | 709/249 |
| 5,805,927 | A | 9/1998 | Bowes et al. | |
| 5,850,386 | A * | 12/1998 | Anderson et al. | 370/241 |
| 5,982,753 | A * | 11/1999 | Pendleton et al. | 370/252 |
| 6,065,053 | A * | 5/2000 | Nouri et al. | 709/224 |
| 6,088,777 | A | 7/2000 | Sorber | |
| 6,938,133 | B2 | 8/2005 | Johnson | |
| 7,002,980 | B1 | 2/2006 | Brewer et al. | |
| 7,007,089 | B2 | 2/2006 | Freedman | |
| 7,035,223 | B1 * | 4/2006 | Burchfiel et al. | 370/248 |
| 7,187,683 | B1 | 3/2007 | Sandoval et al. | |
| 7,443,870 | B2 * | 10/2008 | Zioulas et al. | 370/412 |
| 2002/0183969 | A1 | 12/2002 | Hanes et al. | |
| 2003/0033025 | A1 * | 2/2003 | Lee et al. | 700/5 |
| 2004/0252686 | A1 | 12/2004 | Hooper | |
| 2006/0153078 | A1 * | 7/2006 | Yasui | 370/235 |

OTHER PUBLICATIONS

Ixia, IxExplorer User's Guide, Revision 2.1.0, Published Nov. 1, 1999, pp. 1-384.
Ixia, Specifications for Load Modules—Multilayer Gigibit Ethernet for LM1000LX, LM1000SX, LM1000GBIC, LM1000T, Product Specification Sheet, pp. 1-2.
Ixia, The Ixia 200 Traffic Generator and Analyzer, Product Description, pp. 1-2. Accessed Aug. 15, 2003.
Ixia, Ixia 200 Chassis, Product Description.
USPTO, Office Action for U.S. Appl. No. 12/267,364, Mail Date Jun. 7, 2010.

* cited by examiner

*Primary Examiner*—Derrick W Ferris
*Assistant Examiner*—Mang Yeung
(74) *Attorney, Agent, or Firm*—SoCal IP Law Group LLP; Mark A. Goldstein; Steven C. Sereboff

(57) ABSTRACT

Memory access optimization and communications statistics computation are disclosed. A method may include receiving data unit information for a plurality of data units. Versions of partial network traffic statistic for the data units based on a current data unit may be prepared. A version of the partial network traffic statistic may be stored sequentially in round robin fashion in each of a plurality of banks of a memory. The method may also include receiving a request for full network traffic statistic and preparing the full network traffic based on each set of the partial network traffic statistics. The full network traffic statistics may be provided to the requestor. The methods may be achieved on a network card in a network testing system or via software executing in a network testing system.

12 Claims, 6 Drawing Sheets

MEMORY ACCESS OPTIMIZATION AND COMMUNICATIONS STATISTICS COMPUTATION

NOTICE OF COPYRIGHTS AND TRADE DRESS

A portion of the disclosure of this patent document contains material which is subject to copyright protection. This patent document may show and/or describe matter which is or may become trade dress of the owner. The copyright and trade dress owner has no objection to the facsimile reproduction by any one of the patent disclosure as it appears in the Patent and Trademark Office patent files or records, but otherwise reserves all copyright and trade dress rights whatsoever.

BACKGROUND OF THE INVENTION

1. Field of the Invention

The invention relates to memory access, network communications, and network communications statistics computation.

2. Related Art

Networks such as the Internet carry a variety of data communicated using a variety of networking devices, including servers, routers, hubs, and switches; and network capable devices, including computers, personal digital assistants (PDAs), cell phones, telephones, and other devices. Before placing a network into use, the network, including the networking devices, network media, network segments and network applications included therein, may be tested to ensure successful operation. Network capable devices, networking devices and network applications may be tested, for example, to ensure that they function as intended, comply with supported protocols, and can withstand anticipated traffic demands. Such testing may be performed on already deployed and not yet deployed networking devices, network capable devices, network segments and network applications.

To assist with the construction, installation and maintenance of networks, network applications and network capable devices, networks may be augmented with network analyzing devices, network conformance systems, network monitoring devices, and network traffic generators, all which are referred to herein as network testing systems. The network testing systems may allow for analyzing the performance of networks, network applications and network capable devices by capturing, modifying, analyzing and/or sending network communications. The network testing systems may be used to evaluate how well network capable devices handle data communication, including streaming media and voice communications.

DETAILED DESCRIPTION OF THE INVENTION

Throughout this description, the embodiments and examples shown should be considered as exemplars, rather than limitations on the apparatus and methods described.

A System

Figure 1:
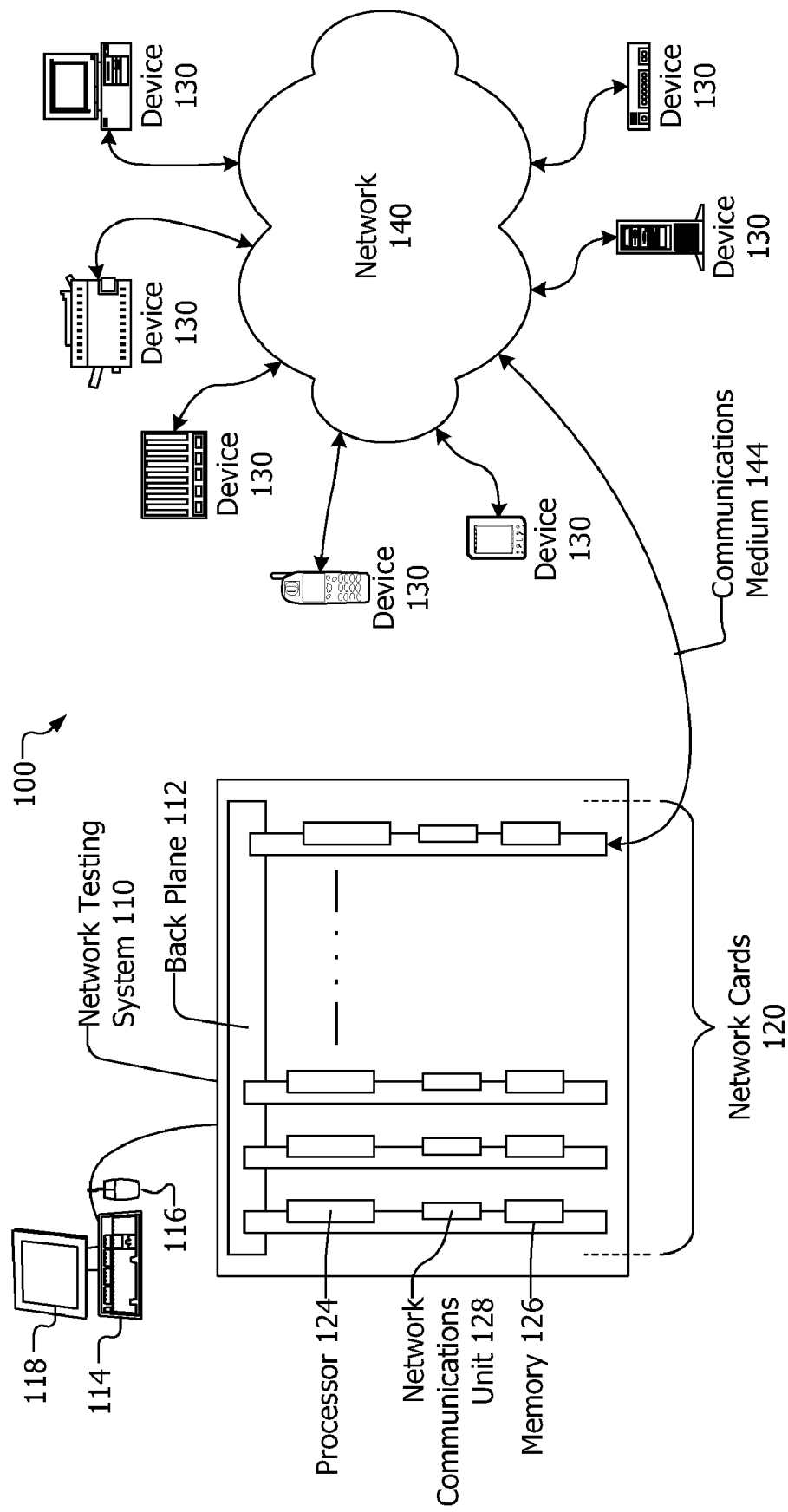
FIG. 1 is a block diagram of an environment in which memory access optimization and communications statistics computation may be implemented.

FIG. 1 is a block diagram of an environment 100 in which memory access optimization and data communication statistics computation may be implemented. The environment 100 includes network testing system 110 coupled via a network card 120 to a network 140 over a communications medium 144. The network testing system 110 may include or be one or more of a performance analyzer, a conformance validation system, a network analyzer, a packet blaster, a network management system, a combination of these, and/or others. The network testing system may be used to evaluate and/or measure characteristics and performance of a communication line or system, including the throughput of network traffic, the number of dropped packets, jitter, and many others. Such testing may be used to evaluate the Mean Opinion Score (MOS) of voice transmission over a network or portion thereof. The network testing system 110 may be used to evaluate the performance of servers; network capable devices such as, for example, computers, personal digital assistants (PDAs), cellular phones, analog telephones, digital telephones, and voice over Internet protocol (VOIP) telephones; networking devices such as, for example, routers, gateways, hubs, load balancers, universal threat management devices (UTMs), firewalls, load sharers, and others; as well as network applications and other software.

The network testing system 110 may be in the form of a chassis or card rack, as shown in FIG. 1, or may be an integrated unit. Alternatively, the network testing system may comprise a number of separate units such as two or more chassis cooperating to provide network analysis, network conformance testing, network capable device testing, networking device testing, network application testing, and other tasks. The chassis of the network testing system 110 may include one or more network cards 120 and a back plane 112. The network cards 120 may be coupled with back plane 112. One or more network cards 120 may be included in network testing system 110. The network cards 120 may be permanently installed in the network testing system 110, may be removable, or may be a combination thereof.

The network testing system 110 and/or one or more of the network cards 120 may include an operating system such as, for example, versions of Linux, Unix and Microsoft Windows.

Network card 120 may be coupled with network 140 via a communications medium 144. Although only one connection over communications medium 144 is shown, each of the network cards 120 may be connected with network 140 over a communications medium. Although only one connection between network card 120 and network 140 over communications medium 144 is shown, the network card 120 may be have two or more connections with network 140 over a communications medium. The communications medium may be, for example, wire lines such as an Ethernet cable, fibre optic cable, and coaxial cable, and may be wireless.

The network testing system 110 and the network cards 120 may support one or more well known higher level communications standards or protocols such as, for example, one or more versions of the User Datagram Protocol (UDP), Transmission Control Protocol (TCP), Real-Time Transport Protocol (RTP), Internet Protocol (IP), Internet Control Message Protocol (ICMP), Internet Group Management Protocol (IGMP), Session Initiation Protocol (SIP), Hypertext Transfer Protocol (HTTP), address resolution protocol (ARP), reverse address resolution protocol (RARP), file transfer protocol (FTP), Simple Mail Transfer Protocol (SMTP); may support one or more well known lower level communications standards or protocols such as, for example, the 10 and/or 40 Gigabit Ethernet standards, the Fibre Channel standards, one or more varieties of the IEEE 802 Ethernet standards, Asynchronous Transfer Mode (ATM), X.25, Integrated Services Digital Network (ISDN), token ring, frame relay, Point to Point Protocol (PPP), Fiber Distributed Data Interface (FDDI), Universal Serial Bus (USB), IEEE 1394 (also known as i.link® and Firewire®); may support proprietary protocols; and may support other protocols. Each network card 120 may support a single communications protocol, may support a number of related protocols, or may support a number or combination of unrelated protocols.

The term "network card" as used herein encompasses line cards, test cards, analysis cards, network line cards, load modules, interface cards, network interface cards, data interface cards, packet engine cards, service cards, smart cards, switch cards, relay access cards, CPU cards, port cards, and others. The network cards 120 may be referred to as blades, particularly when a processor is included on the network card. The network cards 120 may include one or more processors 124, memory 126, and one or more network communications units 128.

The network communications unit 128 may be implemented as one or more field programmable gate arrays (FPGA), application specific integrated circuits (ASIC), programmable logic devices (PLD), programmable logic arrays (PLA), other kinds of devices, and combinations of these. The network communications unit 128 may support one or more communications protocols in hardware. The network communications unit 128 may include a network interface through which the network card 120 may transmit and/or receive communications over the network 140. The network communications unit 128 may be a network interface card (NIC).

The back plane 112 may serve as a bus or communications medium for the network cards 120. The back plane 112 may also provide power to the network cards 120.

The network testing system 110 may have a computer 100 coupled thereto. The computer 100 may be local to or remote from the network testing system 110. In another embodiment, the network testing system 110 may include a CPU on a card, motherboard or backplane that allows the chassis to also serve as a computer workstation. The network testing system 110 may have coupled therewith a display 118 and user input devices such as a keyboard 114 and a mouse 116, as well as other user input devices including, for example, pens and trackballs. The user input devices may be coupled to a network card, other card, motherboard, or backplane included in the chassis.

The network testing system 110 may be implemented in a computer such as a personal computer, server, or workstation, as well as the chassis shown. The network testing system 110 may be used alone or in conjunction with one or more other network testing systems 110. The network testing system 110 may be located physically adjacent to and/or remote to the devices 130 in the network 140. The network testing system 110 may be used to test and evaluate the network 140 and/or portions thereof, devices 130, applications or other software running on devices 130, and/or services provided by network 140 and/or devices 130.

The network 140 may be a local area network (LAN), a wide area network (WAN), a storage area network (SAN), or a combination of these. The network 140 may be wired, wireless, or a combination of these. The network 140 may include or be the Internet. The network 140 may be public or private, may be a segregated test network, and may be a combination of these. The network 140 may be comprised of a single or numerous nodes providing numerous physical and logical paths for data units to travel. The network 140 may be a packet switched network, a data network, or a combination thereof. The network 140 may be the Internet.

Communications on the network 140 may take various forms, including frames, cells, datagrams, packets, higher level logical groupings of data, or other units of information, all of which are referred to herein as data units. Those data units that are communicated over a network are referred to herein as network traffic. The network traffic may include data units that represent electronic mail messages, computer files, web pages, graphics, documents, audio and video files, streaming media such as music (audio) and video, telephone (voice) conversations, and others. The network traffic may also be referred to as communications and network communications.

The devices 130 may be devices capable of communicating over the network 140 and/or listening to, injecting, delaying, dropping, and/or modifying network traffic on network 140. The devices 130 may be network capable devices such as computer workstations, personal computers, servers, portable computers, set-top boxes, video game systems, personal video recorders, telephones (cellular, digital, VOIP), personal digital assistants (PDAs), computing tablets, and the like; peripheral devices such as printers, scanners, facsimile machines and the like; network capable storage devices including disk drives such as network attached storage (NAS) and SAN devices; network testing equipment such as analyzing devices, network conformance systems, emulation systems, network monitoring devices, and network traffic generators; and networking devices such as routers, relays, firewalls, hubs, UTMs, switches, bridges, traffic accelerators, and multiplexers. In addition, the devices 130 may include appliances such as refrigerators, washing machines, and the like as well as residential or commercial heating, ventilation, and air conditioning (HVAC) systems, alarm systems, and other devices or systems capable of communicating over a network. One or more of the devices 130 may be devices to be tested and may be referred to as devices under test.

Figure 2A:
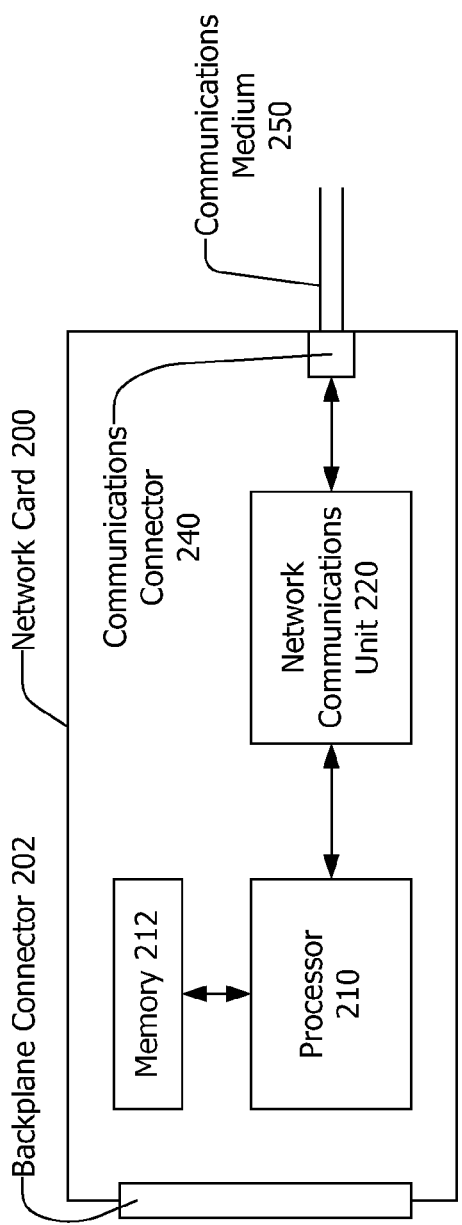
FIG. 2A is a block diagram of a first network card.
Figure 2B:
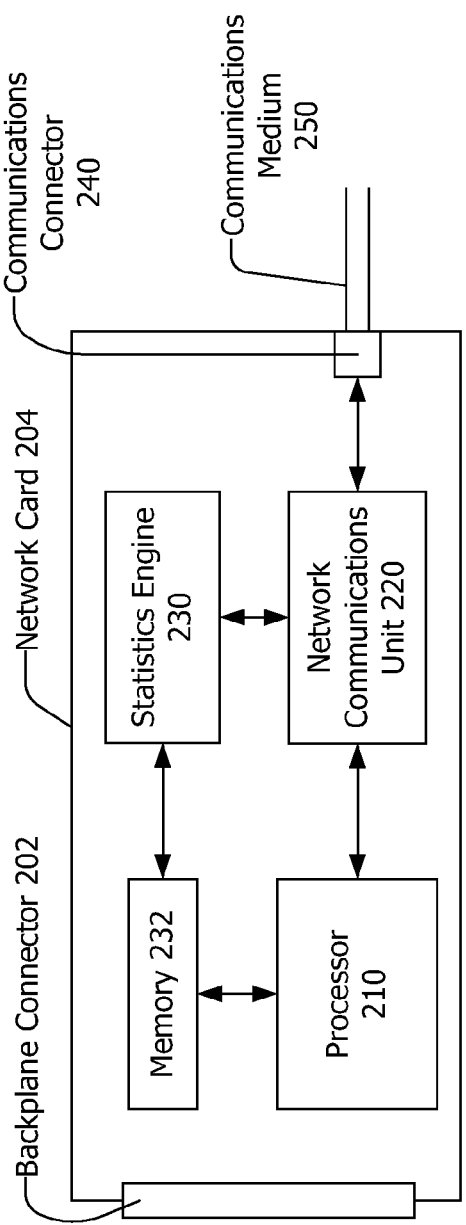
FIG. 2B is a block diagram of a second network card.

FIG. 2A is a block diagram of a first network card 200, and FIG. 2B is a block diagram of a second network card 204. The network cards 200 and 204 may include hardware, software, firmware, and/or a combination thereof. The network cards 200 and 204 each may include may include a processor 210, a network communications unit 220, a backplane connector 202, and a communications connector 240. In the network card 200, the processor 210 may be coupled with a memory unit 212 and the network communications unit 220. The network card 204 may include a statistics engine 230. The statistics engine 230 may be implemented on or as an FPGA, and may also be implemented on or as an ASIC, PLD or other hardware device. The statistics engine 230 may be coupled with the network communications unit 220 and the memory 232, and the processor 210 may also be coupled with the memory 232. The statistics engine 230 may also be coupled with or include a second memory and/or a cache memory, not shown in FIG. 2B.

The network cards 200 and 204 may have two or more network communications units 220 and a corresponding number of communications connectors 240. The network card 200 may also have two or more memory units 212 and/or two or more processors 210 included thereon. The network card 204 may have two or more statistics engines 230 include thereon. The network cards 200 and 204 may include an operating system or a real-time operating system. In one embodiment of network card 200, the memory unit 212 is coupled with both the processor 210 and the network communications unit 220. In one embodiment of network card 204, the memory unit 232 is also coupled with the network communications unit 220. The backplane connector 202 may allow the network cards 200 and 204 to be coupled with a network testing system such as networking testing system 110.

In network card 200, the processor 210 may be a multipurpose processor, such as, for example, a PowerPC processor available from IBM, Inc., and may be a specialized processor. The processor 210 may include an internal cache memory and an arithmetic logic unit or other logic unit. The processor 210 may be capable of executing instructions which may be located in a local memory, other storage medium, or other local or remote storage device.

The memory 212 and 232 may be dynamic random access memory (DRAM). In one embodiment, the memory 212 and 232 are each a 512 Mbyte DRAM having 2 Kbytes per row. An example embodiment of memory 212 and 232 is discussed in more detail below regarding FIG. 3.

The network cards 200 and 204 may include and/or have access to local and/or remote memory, storage media and storage devices. Instructions to be executed by the processor may be stored on and executed from a local or remote machine readable medium or storage device. A machine readable medium includes, for example, without limitation, magnetic media (e.g., hard disks, tape, floppy disks), optical media (e.g., CD, DVD), flash memory products (e.g., memory stick, compact flash and others), and volatile and non-volatile silicon memory products (e.g., random access memory (RAM), programmable read-only memory (PROM), electronically erasable programmable read-only memory (EEPROM), and others). A storage device is a device that allows for the reading from and/or writing to a machine readable medium. Storage devices include hard disk drives, DVD drives, flash memory devices, and others.

The network communications unit 220 may include one or more circuits, chips, logic, firmware and/or instructions that allow for communication over a network according to the optimized data unit communications techniques described herein. The network communications unit 220 may be implemented as one or more FPGAs. The network communications unit 220 may also be implemented or included on one or more ASICs, silicon devices, integrated circuits, specialized processors such as a network processor, or other devices. The network communications unit 220 may be coupled with the communications connector 240.

The network communications unit 220 may be coupled with a communications medium 250 via the communications connector 240. The communications medium 250 may be a wire such as Ethernet cabling, coaxial cable, fibre optic cable, and others, and may be wireless.

Additional and fewer units, hardware and firmware may be included in the network cards 200 and 204 to achieve the techniques described herein.

In one embodiment, the methods described herein are achieved by software executing on processor 210 of network card 200. In another embodiment, the methods described herein are achieved by executing code or instructions stored on or as statistics engine 230 of network card 204.

Figure 3:
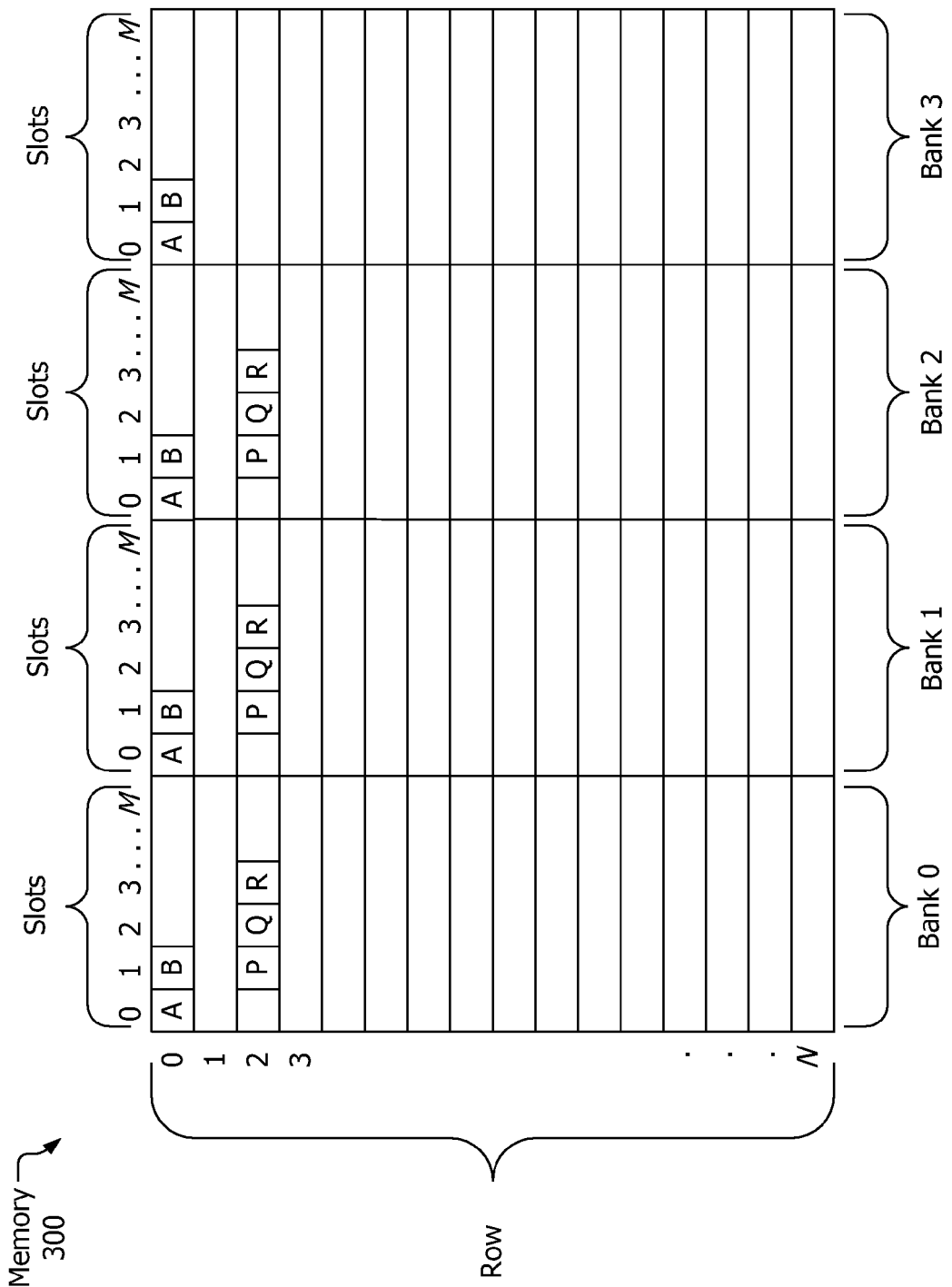
FIG. 3 is a block diagram of a memory and the contents thereof.

FIG. 3 is a block diagram of a memory 300 and the contents thereof. Memory 300 is an embodiment of the memory 126, the memory 212 and the memory 232 of FIGS. 1, 2A and 2B. The memory 300 may be a DRAM having a size of 512 Mbyte and having 2 Kbytes per row. The DRAM may be a dual in-line memory module (DIMM) or a small outline (SO) DIMM. When network testing systems acquire, prepare and report summaries of information about network traffic, various data about the network traffic may be maintained. When data units are received and/or sent, information about the data units may be stored in a queue. This information is referred to herein as data unit information. The data unit information stored may include: data unit size, data unit type, sequence number, flow number, socket, stream, port, protocol, send and/or receive timestamps, source address, destination address, error code (if any), payload type, and others.

The data unit information may be used to prepare and provide summaries or reports concerning the network traffic. The summaries and reports may include, for example, one or more of the following network traffic data: byte count, data unit count (for example, number of packets received and/or sent); minimum data unit latency; maximum data unit latency; average data unit latency; number of errors; kinds of errors; oldest, first or earliest timestamp; most recent, last or latest timestamp; and others. This network traffic data may be reported per device, per network segment, per stream, per sequence, per flow, per data unit type, and/or overall.

To improve the access to network traffic data for use in network traffic summaries and reports, and/or to provide near real-time network traffic summaries or reports, versions of partial network traffic data may be stored iteratively in a round robin fashion in four banks of the memory 300. Each version of the partial network traffic is different because it is based on different data unit information from different data units. In the example shown in FIG. 3, four different versions of partial network traffic data for flow A is stored in row 0, slot 0 of banks 1, 2, 3 and 4. To prepare network traffic statistics for flow A, the four partial network traffic statistics data in each of banks zero through three must be added, analyzed or otherwise processed. Depending on the embodiment, the partial network traffic may be stored per flow, stream, source address, destination address, socket, network segment, device, etc. For example, a version of the partial network traffic statistics for flow Q, stream Q, source address Q may be stored as shown in FIG. 3 in row 2, slot 2. In one embodiment each slot is a record that is 64 bytes of data. That is, each set of partial network traffic statistics may be 64 bytes. In various embodiments, the size of the record in memory and the size of each set of the partial network traffic statistics, as well as the size of the full network traffic statistics, may be 32, 64, 48, 128, 178, 256, etc. bytes. It is contemplated that the methods described herein may work with other numbers of memory banks, such as, for example, 8, 10, 12, 16 and others.

Methods

Figure 4:
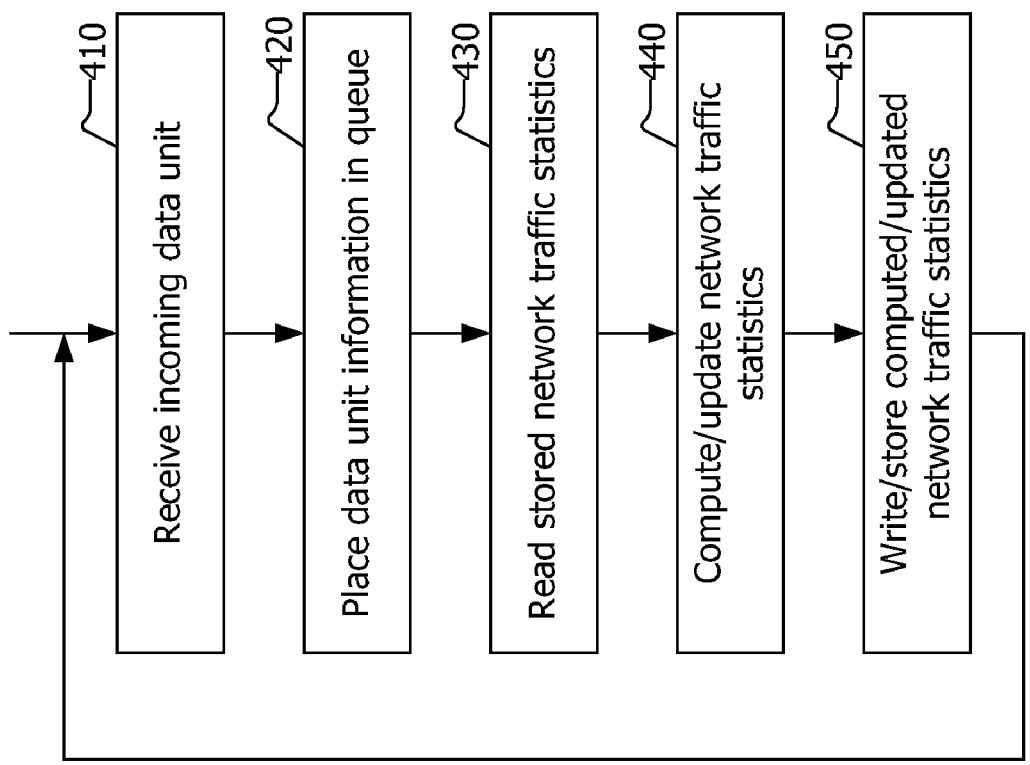
FIG. 4 is a flow chart of a method of communications statistics computation.

FIG. 4 is a flow chart of a method of communications statistics computation. A network card, the statistics engine running in an FPGA or other PLD included in a network card, or software running on a processor or in computing device may perform this method. An incoming data unit is received, as shown in block 410. Information about the data unit may be placed in a queue for later or immediate processing, as shown in block 420. Stored network traffic statistics are read or retrieved from memory, as shown in block 430. Network traffic statistics may then be computed and/or updated based on the data units in the queue, as shown in block 440. The network traffic statistics that are computed and/or updated may pertain to a particular flow of data units, all data units, and/or a particular class or type of data units. Some individual network traffic statistics may be computed/updated by, for example, simple adding, such as, for example, the total number of bytes received (sometimes referred to as byte count), the total number of data units received (sometimes referred to a packet count), and others. Other individual network traffic statistics may be computed/updated by performing some simple analysis, such as, for example, determining the earliest or latest timestamp which requires a simple comparison of the timestamp in the current data unit with the stored earliest/latest timestamp in the network traffic statistics. The computed and/or updated network traffic statistics are stored, such as by writing them to memory, as shown in block 450.

However, when performing the method described regarding FIG. 4, the updating and computing of the network traffic statistics may be delayed and may be inefficient due to memory access characteristics typically referred to as latency. When the actions described in FIG. 4 are performed in order, memory latency causes a delay in the preparation of network traffic statistics due to the delay incurred in writing network traffic statistics to memory, as shown in block 450. The delay is caused by memory writing overhead, namely the time and clock cycles it takes to write to and close the memory. What may occur is that incoming data units may be added to the queue at network speed, also known as, in one embodiment, wire line speed. Even when the computation of network traffic statistics is very fast and efficient (that is, taking a limited amount of time and computation cycles), before the network traffic statistics are updated based on the next data unit, the currently processed network traffic statistics are stored to memory. As such, the computing of updated network traffic statistics for the next data unit must wait until the network traffic statistics based on the current data unit are stored. This delay is caused by memory latency. As such, there is a delay in preparing and reporting network traffic statistics caused memory access latency, and, in particular, overhead in the form of the time and clock cycles it takes to close the memory.

To alleviate or reduce the impact of the latency inherent in writing to memory, and in particular writing to DRAM, versions of partial network statistics may be accessed (that is read and written) in a pipelined manner. To reduce or eliminate the impact of the amount of time and clock cycles it takes to open and close a bank of memory, partial network traffic statistics may be stored in memory 300 as described above regarding FIG. 3 so that the memory 300 may be accessed in a pipelined round robin manner as shown in and described regarding FIG. 5.

Figure 5:
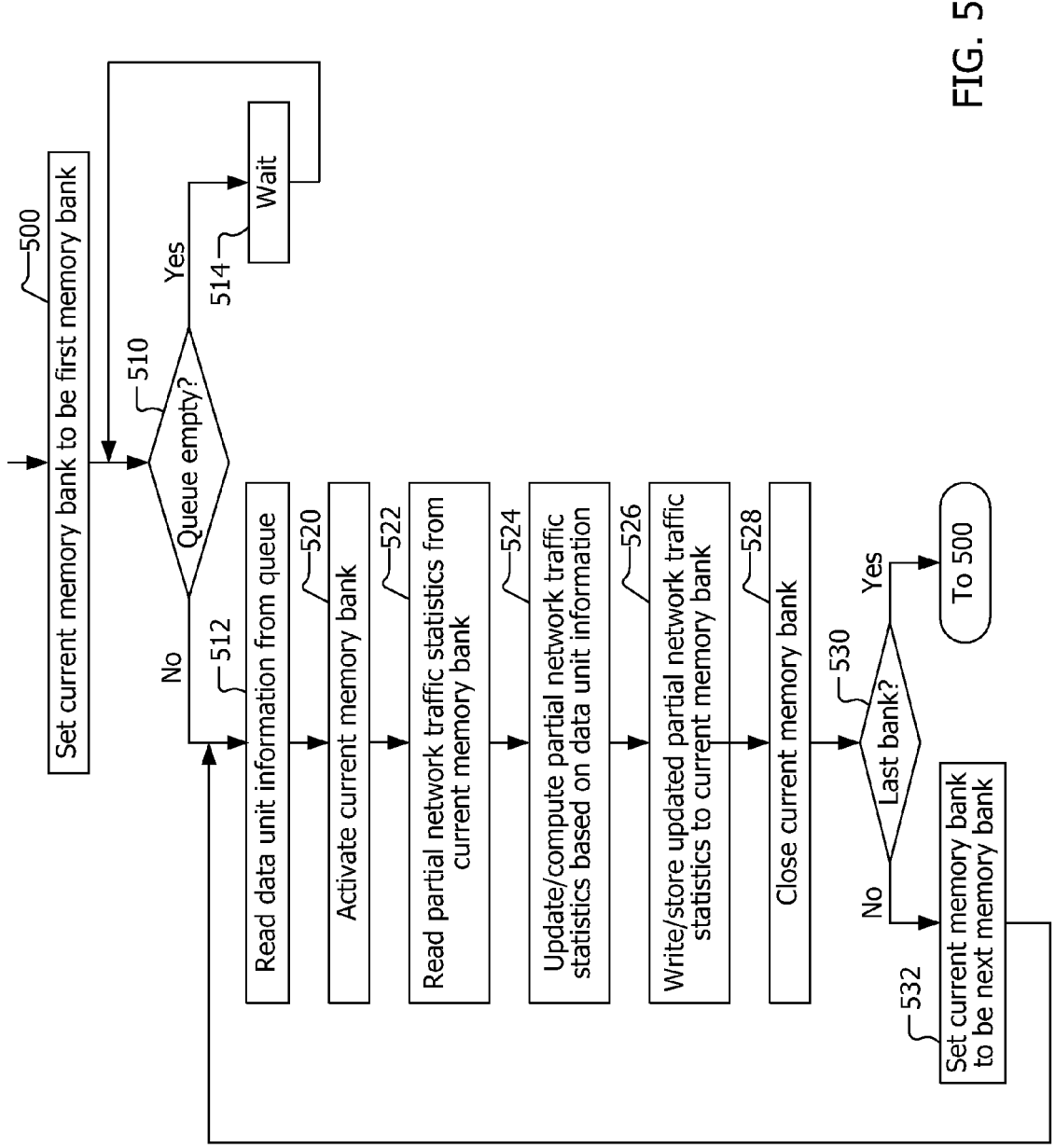
FIG. 5 is a flow chart of a method of memory access optimization and communications statistics computation.

FIG. 5 is a flow chart of a method of memory access optimization and communications statistics computation. The communications statistics may also be referred to as network traffic statistics as described above. A network card, the statistics engine running in an FPGA or other PLD included in a network card, or software running on a processor or in computing device may perform this method. This method may be implemented with a memory 300 like that shown in FIG. 3 and described above. A current memory bank is set to be the first memory bank of the memory, as shown in block 500. This would be, for example, bank 0 shown in FIG. 3. The flow of actions may continue based on whether a queue of incoming data unit information is empty, as shown in block 510. If the queue of incoming data unit information is empty, after a short wait or delay, as shown in block 514, the queue may be checked again, as shown in block 510.

If the queue of incoming data unit information is not empty, as shown in block 510, the flow of actions may continue at block 512. Incoming data unit information may be read from the queue, as shown in block 512. The current memory bank may be activated, as shown in block 520. Partial network traffic statistics may be read from a memory location in the current memory bank, as shown in block 522. In one embodiment, a memory read includes memory bank activation so that blocks 520 and 522 may be combined, or block 520 may not be needed. The partial network traffic statistics may be computed and/or updated based on the data unit information, as shown in block 524. The computed/updated partial network traffic statistics may be written or stored to the memory at a location in the current bank, as shown in block 526. The memory bank may be closed, as shown in block 528. In one embodiment, a memory write includes memory bank closing, so that blocks 526 and 528 may be combined, or block 528 may not be needed.

The flow of actions may continue based on whether the current memory bank is the last memory bank, as shown in block 530. In one embodiment, there are four memory banks and bank 3 is the last memory bank, as shown in memory 300 of FIG. 3. When the current memory bank is the last memory bank, the flow of actions may continue at block 500.

When the current memory bank is not the last memory bank, the flow of actions may continue at block 532, where the current memory bank may be set to be the next memory bank. The flow of actions may continue at block 512.

As shown in FIG. 5, reads from and writes to each memory bank may proceed in sequence. However, each of the steps need not be completed before for the next step proceeds. Importantly, the memory writes need not be completed on the current memory bank before memory reads for the next memory bank are processed. As such, processing of data unit information as shown in blocks 512, 520, 522, and 524 for a current memory bank may proceed concurrently with the writing of the updated partial network traffic statistics based on the previous data unit information and the closing of the previous memory bank as shown in blocks 526 and 528. By allowing reading and processing of current data unit information with partial network statistics from one memory bank while concurrently writing partial network statistics to another memory bank based on prior data unit information in a round robin pipelined fashion reduces or alleviates the delay in preparing network statistics caused by memory latency.

Figure 6:
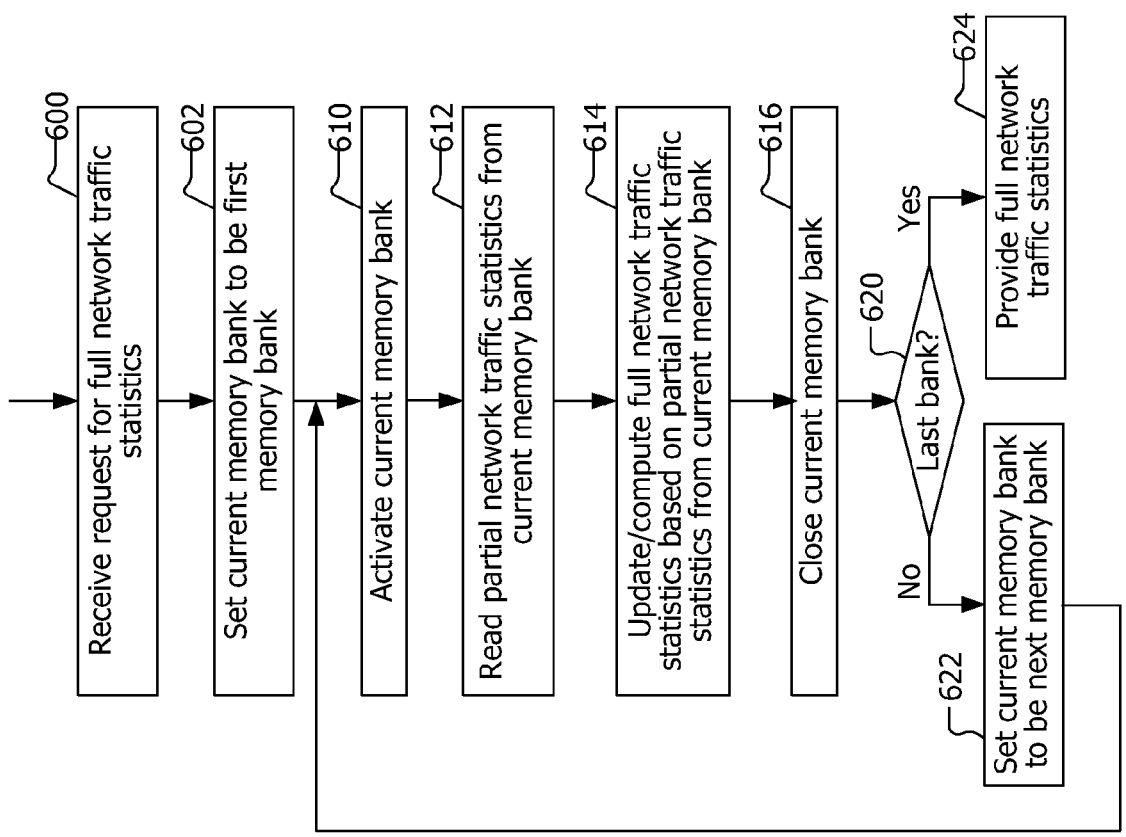
FIG. 6 is a flow chart of a method of preparing communications statistics.

FIG. 6 is a flow chart of a method of preparing communications statistics. The communications statistics may also be referred to as network traffic statistics as described above. A network card, the statistics engine running in an FPGA or other PLD included in a network card, or software running on a processor or in computing device may perform this method. This method may be implemented with a memory 300 like that shown in FIG. 3 and described above.

A request for full network statistics may be received, as shown in block 600. The full network traffic statistics may pertain to a particular flow or stream of data units, data units having a particular source address, data units having a particular destination address, all data units, and/or a particular class or type of data units. The requester may be a software program running on a network testing system. The request may be user initiated or automatically generated. An automatically generated request may be made every 1, 5, 10, 12, 20, 30, 44, etc. seconds, every 1, 2, 6, 8, 12, etc. minutes, every hour, every few hours, etc. An automatically generated request may be user configurable or may be system defined. An automatically generated request may be achieved using a daemon or other software process, utility, construct, etc.

A current memory bank may be set to be the first memory bank of the memory, as shown in block 602. This would be, for example, bank 0 shown in FIG. 3. The current memory bank may be activated, as shown in block 610. Partial network traffic statistics may be read from the current memory bank, as shown in block 612. In one embodiment, a memory read includes memory bank activation so that blocks 610 and 612 may be combined, or block 610 may not be needed.

Full network traffic statistics may be updated and/or computed based on the partial network traffic statistics read from the current memory bank, as shown in block 614. In one embodiment, according to the example shown in FIG. 3, when the are four memory banks, four sets of partial network statistics are computed by adding or otherwise processing each version of the four sets of partial network statistics. To prepare the full network traffic statistics, some individual network traffic statistics may be computed/updated by, for example, simple adding, such as, for example, the total number of bytes received (sometimes referred to as byte count), the total number of data units received (sometimes referred to a packet count), and others. Other individual network traffic statistics may be computed/updated by performing simple analysis, such as, for example, determining the earliest or latest timestamp which requires a simple comparison of the timestamp in the partial network statistics with the earliest/latest timestamp. The current memory bank may be closed, as shown in block 616. In one embodiment, a memory write includes memory bank closing, so that blocks 614 and 616 may be combined, or block 616 may not be needed.

The flow of actions may continue based on whether the current memory bank is the last memory bank, as shown in block 620. In one embodiment, the last memory bank check may be a check to learn whether the current memory bank is the fourth of four memory banks, such as when the memory 300 from FIG. 3 is used. When the current memory bank is not the last memory bank, the flow of actions may continue at block 622, where the current memory is set to be the next memory bank. The flow of actions may continue at block 610 as described above. When the current memory bank is the last memory bank, the flow of actions may continue at block 624, where full network statistics are provided to the requester.

With regard to FIGS. 4, 5 and 6, additional and fewer steps may be taken, and the steps as shown may be combined or further refined to achieve the methods described herein.

Closing Comments

As used herein, "plurality" means two or more.

As used herein, a "set" of items may include one or more of such items.

As used herein, whether in the written description or the claims, the terms "comprising", "including", "carrying", "having", "containing", "involving", and the like are to be understood to be open-ended, i.e., to mean including but not limited to. Only the transitional phrases "consisting of" and "consisting essentially of", respectively, are closed or semi-closed transitional phrases with respect to claims.

Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

As used herein, "and/or" means that the listed items are alternatives, but the alternatives also include any combination of the listed items.

Although exemplary embodiments have been shown and described, it will be apparent to those having ordinary skill in the art that a number of changes, modifications, or alterations as described herein may be made. All such changes, modifications and alterations should therefore be seen as within the scope of below claims.

It is claimed:

1. A method comprising:
    receiving in a network card included in a network testing system data unit information for a plurality of data units;
    updating in the network card partial network traffic statistics for some of the plurality of data units based on a current data unit of the plurality of data units, wherein a version of the partial network traffic statistics is stored sequentially in round robin fashion in each of a plurality of memory banks of a memory included in the network card;
    receiving in the network testing system a request for full network traffic statistics from a requestor;
    the network testing system preparing the full network traffic statistics including
        retrieving from the memory each version of the partial network traffic statistics, adding some individual statistics of each of the partial network statistics, and processing some individual statistics of the partial network statistics;
    the network testing system providing the full network traffic statistics to the requestor.

2. The method of claim 1 wherein the partial network traffic statistics include at least one of a byte count, a data unit count, a most recent timestamp, an oldest timestamp, a number of errors, a maximum data unit size, and a minimum data unit size.

3. The method of claim 1 wherein the partial network traffic statistics are maintained per one selected from the group comprising: a flow, a source address, a destination address, a socket, a stream, a data unit type, a network segment, and a port.

4. The method of claim 1 wherein the full network statistics include at least one of a byte count, a data unit count, a most recent timestamp, an oldest timestamp, a number of errors, a maximum data unit size, and a minimum data unit size.

5. The method of claim 1 wherein the full network statistics are prepared for one selected from the group comprising: a flow, a source address, a destination address, a socket, a stream, a data unit type, a network segment, and a port.

6. A network testing system configured to perform the method recited in claim 1.

7. A network card comprising:
    a processor;
    a memory having a plurality of banks;
    a hardware device coupled with the processor and the memory, the hardware device configured to perform actions including:
        receiving data unit information for a plurality of data units;
        updating partial network traffic statistics for some of the plurality of data units, wherein a version of the partial network traffic statistics is stored sequentially in round robin fashion in each of the plurality of the banks of the memory;
        receiving a request for full network traffic statistics from a requestor;
        preparing the full network traffic statistics including
            retrieving each version of the partial network traffic statistics, adding some individual statistics of the partial network statistics, and processing some individual statistics of the partial network statistics;
        providing the full network traffic statistics to the requestor.

8. The network card of claim 7 wherein the partial network traffic statistics include at least one of a byte count, a data unit count, a most recent timestamp, an oldest timestamp, a number of errors, a maximum data unit size, and a minimum data unit size.

9. The network card of claim 7 wherein the partial network traffic statistics are maintained per one selected from the group comprising: a flow, a source address, a destination address, a socket, a stream, a data unit type, a network segment, and a port.

10. The network card of claim 7 wherein the full network statistics include at least one of a byte count, a data unit count, a most recent timestamp, an oldest timestamp, a number of errors, a maximum data unit size, and a minimum data unit size.

11. The network card of claim 7 wherein the full network statistics are prepared for one selected from the group comprising: a flow, a source address, a destination address, a socket, a stream, a data unit type, a network segment, and a port.

12. A network testing system including at least one network card recited in claim 7.

* * * * *